US006696949B2

(12) United States Patent  
Warren

(10) Patent No.: US 6,696,949 B2  
(45) Date of Patent: Feb. 24, 2004

(54) TELEVISION SECURITY DEVICE

(76) Inventor: Thomas J. Warren, 5912 Walnut St., Temple Hills, MD (US) 20748

( * ) Notice: Subject to any disclaimer, the term of this patent is extended or adjusted under 35 U.S.C. 154(b) by 171 days.

(21) Appl. No.: 10/055,779

(22) Filed: Jan. 23, 2002

(65) Prior Publication Data

US 2002/0126018 A1 Sep. 12, 2002

Related U.S. Application Data

(63) Continuation-in-part of application No. 09/495,681, filed on Feb. 1, 2000.

(51) Int. Cl.$^7$ ............................................. G08B 13/12
(52) U.S. Cl. ........................... 340/568.3; 340/568.4; 340/687
(58) Field of Search ........................ 340/568.3, 568.4; 348/152, 156, 5; 380/7; 361/185, 111, 114; 307/116; 455/3

(56) References Cited

U.S. PATENT DOCUMENTS

| | | | | |
|---|---|---|---|---|
| 3,715,514 A | * | 2/1973 | Bell, Jr. ........................ 379/442 |
| 3,997,737 A | * | 12/1976 | Watkins ........................ 379/162 |
| 4,016,428 A | | 4/1977 | Gutterman .................. 307/116 |
| 4,443,815 A | | 4/1984 | Hempell ...................... 358/114 |
| 4,949,375 A | * | 8/1990 | Houle ........................... 379/199 |
| 5,142,269 A | | 8/1992 | Mueller ........................ 340/568 |
| 5,267,120 A | | 11/1993 | Graff et al. .................. 361/185 |
| 5,323,462 A | | 6/1994 | Farmer ............................ 380/7 |
| 5,331,412 A | | 7/1994 | Farmer et al. ................ 348/5.5 |
| 5,721,659 A | | 2/1998 | Young .......................... 361/111 |
| 5,729,824 A | | 3/1998 | O'Neill et al. ............... 455/3.1 |
| 5,923,516 A | | 7/1999 | Young .......................... 361/111 |

\* cited by examiner

*Primary Examiner*—Jeffery Hofsass  
*Assistant Examiner*—Jennifer Stone  
(74) *Attorney, Agent, or Firm*—Stephen R. Greiner

(57) ABSTRACT

A security device including a power supply and a pair of conductors connecting the power supply with a source of alternating current. A switch, associated with the first conductors, selectively breaks the connection between the power supply and current source. An outlet is connected by a pair of second conductors to the first conductors such that the switch also breaks the connection between the outlet and current source. A power cutoff relay is connected to the power supply so as to be energized by direct current from it. A normally open contact set is closed by the power cutoff relay to connect the alternating current source with the outlet through the second conductors. An alarm emits an audible signal when energized by direct current from the power supply. A current sensor senses the flow of alternating current from the outlet and operates a switch to permit the flow of direct current to the alarm when alternating current flow is sensed. A pair of jacks is connected to common ground and connected together by a pair of third conductors through which a communications signal is passed. A pair of signal transfer relays is connected to the power supply. A pair of second normally open contact sets is associated with the third conductors and each is closed by one of the signal transfer relays when energized to connect the jacks together.

3 Claims, 2 Drawing Sheets

US 6,696,949 B2

TELEVISION SECURITY DEVICE

CONTINUING APPLICATION INFORMATION

This application is a continuation-in-part of the application, Ser. No. 09/495,681, filed Feb. 1, 2000.

FIELD OF THE INVENTION

The present invention relates generally to electrical communications systems and, more particularly, to auxiliary equipment for preventing televisions or VCRs from being utilized as eavesdropping devices.

BACKGROUND OF THE INVENTION

Diplomats have used information available from CNN and other television news networks for years in conducting their business. Unfortunately, their access to this information has been limited because televisions, VCRs, and other electronic devices can be used for eavesdropping purposes. It is well known that conductors employed by a television to convey electrical power and television signals can be used by sophisticated bugging devices to transmit intercepted conversations to remote locations. One solution to this problem has been to laboriously connect and disconnect the power and signal conductors from a television after each use. This procedure has been found to wear out electrical connectors and inconvenience diplomats. In some cases, inattention has led to conductors not being disconnected for extended periods of time. Enforcing rules requiring disconnection of power and signal conductors from a television in an area intended to be secure is difficult.

SUMMARY OF THE INVENTION

In light of the problems associated with known manner in which televisions are disconnected from power and television signal sources so as to render them secure against eavesdropping, it is a principal object of the invention to provide a television security device that permits the quick, easy, and simultaneous disconnection of a television from power and RF or data signal sources with the manipulation of a single switch. Once disconnected, this device terminates television coaxial lines with their nominal characteristic impedance and isolates fortuitous ground paths to reduce conducted and radiated signal emissions. Moreover, the security device incorporates a current sensor and an alarm to notify a user that disconnection of the sort described has not been made.

It is another object of the present invention to provide a security device of the type described that can be used to make apparatus other than televisions secure from eavesdropping. For example, the security device could be used with VCRs and personal computers connected to remote networks. In fact, the security device can be employed with virtually any electronic apparatus connected by wire to remote electrical and signal sources.

It is a further object of the invention to provide a security device that internally forms multiple electrical signal paths or loops while in a secure mode to reduce the likelihood of a breach by sophisticated eavesdropping equipment.

It is an object of the invention to provide improved elements and arrangements thereof in a television security device for the purposes described which is lightweight in construction, inexpensive to manufacture, and dependable in use.

Briefly, the security device in accordance with this invention achieves the intended objects by featuring a rectifier and a pair of conductors connecting the rectifier with a source of alternating current. A switch, associated with the first conductors, selectively breaks the connection between the rectifier and alternating current power source. An electrical outlet or bank of such outlets is connected by a pair of second conductors to the first conductors such that the switch also breaks the connection between the outlet and alternating current power source. A power cutoff relay is connected to the voltage regulator output so as to be energized by direct current from it. A contact set is closed by the power cutoff relay to connect the alternating current source with the electrical outlet through the second conductors. An optocoupler current sensor senses the flow of alternating current through the electrical outlet and operates a transistor switch to control the flow of direct current to an alarm when alternating current flow is sensed. A pair of jacks is connected together by a pair of third conductors through which a communications signal is passed. A pair of signal transfer relays is connected to the voltage regulator output. The signal transfer relays are connected to wideband unbalanced to balanced radio frequency (RF) signal transformers connected to ground isolated signal jacks and resistive terminations. When energized, the relays connect the signal jacks together. Otherwise, the signal lines are terminated and isolated from ground. In this state, all RF energy is dissipated in the resistive loads and there is no reflected power on the signal lines.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
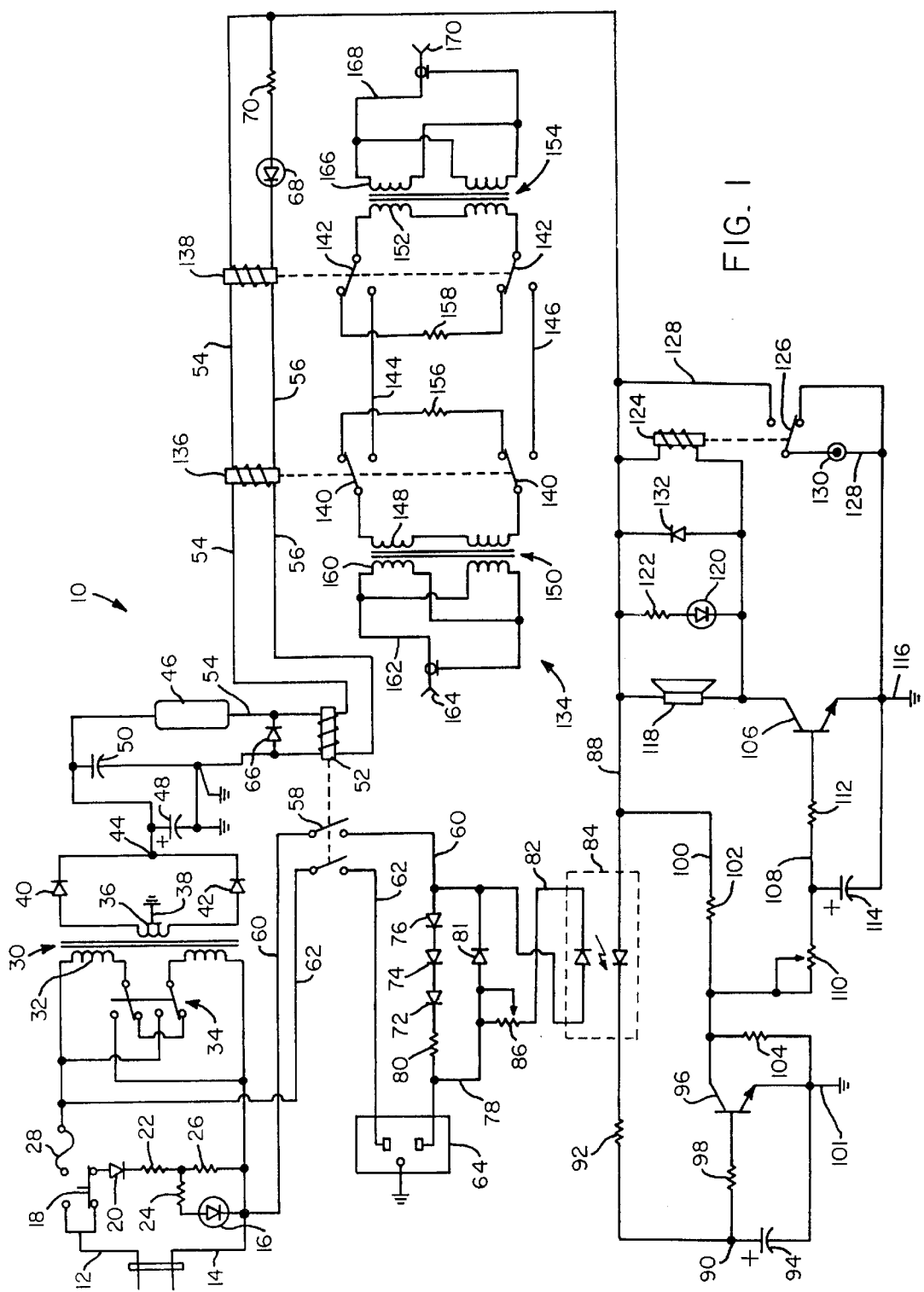
FIG. 1 is a schematic diagram of a television security device in accordance with the present invention shown in an off or secure condition.

Referring now to the FIGS., a television security device in accordance with the present invention is shown at 10. Device 10 is connected by conductors 12 and 14 to a source of alternating current (AC) such as a wall outlet. A light emitting diode (LED) 16 is operably connected to conductors 12 and 14 through a manually operated switch 18 when it is desired that potential eavesdropping with a television (not shown) be averted. A green light emitted by LED 16 indicates to a user that device 10 is operational in this regard. To maintain LED 16 in an operational state, a diode 20 provides a forward bias current and series resistors 22 and 24 form a voltage divider. Another resistor 26 is connected in series with LED 16 to limit current to an appropriate value.

When use of a television takes precedence over eavesdropping protection, switch 18 may be utilized to selectively connect conductor 12 through a fuse 28 to a rectifier and filter capacitor 48 for converting AC to direct current (DC).

The power supply includes a transformer 30 having a pair of primary windings as at 32 connected to conductors 12 and 14. A manually operated voltage selector switch 34 connects transformer 30 with the conductors 12 and 14 so that windings 32 may connected in series to rectify 220-volt AC or connected in parallel to rectify 110-volt AC. (This feature is particularly useful for overseas applications.) Transformer 30 also has a secondary winding 36 that is center tapped at 38 to ground and end terminals connected to the anodes of rectifier diodes 40 and 42. The cathodes of diodes 40 and 42 are connected to a positive lead 44 of electrolytic capacitor 44 which filters the full-wave rectified AC voltage thereby providing DC voltage for the circuitry. Parallel capacitor 50 suppresses voltage transients.

The input of voltage regulator 46 is connected to terminal 44. Voltage regulator 46 is a device or circuit that maintains a load voltage nearly constant over a range of variations of input voltage and load current. Voltage regulator 46 is employed in device 10 since unregulated voltage may vary more than can be tolerated by the electrical components using the voltage.

A power cutoff relay 52 is connected by a conductor 54 to the output contact of voltage regulator 46 and by another conductor 56 to ground. Relay 52 operates a pair of contacts 58 in conductors 60 and 62 that connect a conventional electrical outlet 64 with conductors 12 and 14. Preferably, conductor 62 is joined to fuse 28 and so that its connection to conductor 12 may be selectively broken by switch 18 whereas conductor 60 is connected directly to conductor 14. By plugging its electrical supply cord into outlet 64, a television is provided with a source of alternating electrical current that may be tapped by energizing the television in the normal manner. A diode 66 is connected in parallel with relay 52 to provide a return path for relay discharge currents and to protect the electronic circuitry. Additionally, an LED 68 and series current limiting resistor 70 are connected in parallel with relay 52 so as to emit a yellow light when relay 52 is energized.

Diodes 72, 74 and 76 are connected in series with a resistor 80 to conductor 60 between contact 58 and outlet 64 to set a threshold voltage. As the cathodes of each diode 72, 74 and 76 are oriented toward outlet 64, electrical current can only flow through conductor 60 only toward outlet 64. The opposite ends of a conductor 78 carrying a diode 81 are joined to conductor 60 to provide a path for electrical current flow around diodes 72, 74 and 76 and resistor 80. As the cathode of diode 81 is oriented away from outlet 64, electrical current can only flow through conductor 78 only away from outlet 64.

A conductor 82 is connected to conductor 78 through a series potentiometer 86. Conductor 82 supplies a forward bias current to optocoupler 84, and potentiometer 86 is set to limit the flow of electrical current to optocoupler 84 in proportion to the load connected to outlet 64. The existence of a controlling electrical current flow through conductor 82 is transmitted optically by optocoupler 84 to a conductor 88 joined therewith in a manner that provides total electrical isolation between conductors 82 and 88. Conductor 88 is connected to the output contact of voltage regulator 46 such that when electrical current flow is sensed by optocoupler 84 in conductor 82, electrical current flows in conductor 88. However, when electrical current flow ceases in conductor 82 electrical current flow ceases in conductor 88. Thus, optocoupler 84 serves as an alternating current sensor in device 10.

Since optocoupler 84 allows electrical current flow through conductor 88 when voltage in conductor 82 is greater than the threshold voltage, the optocoupler 84 generates electrical current pulses in conductor 88 that must be integrated to provide a constant DC output to terminal 90 at the end of conductor 88. To accomplish this result, a resistor 92 is connected to conductor 88 between optocoupler 84 and terminal 90 and an electrolytic capacitor 94 is connected to terminal 90. Resistor 92 and electrolytic capacitor 94 serve as a pulse integrator with a time constant several times greater than the period of pulses generated by optocoupler 84.

The base of an inverter transistor 96 is connected to terminal 90 through a base current limiting resistor 98. Resistors 100 and 104 form a voltage divider and limit the current through the collector of inverter transistor 96.

The base of a driver transistor 106 is connected by a conductor 108 to conductor 100 between transistor 96 and resistor 102. Conductor 108 feeds a potentiometer 110 and a resistor 112 for limiting electrical current flow to the base of transistor 106. An electrolytic capacitor 114 is connected to conductor 108 between potentiometer 110 and resistor 112. Together, potentiometer 110 and capacitor 114 function as a time delay network to abate the flow of transistor 106 collector current, thereby reducing transient responses. When collector current flows in transistor 106, a condition is established that requires a user to restore a load to outlet 64 or deenergize device 10 by connecting switch 18 to LED 16.

The emitter of transistor 106 is connected to ground at 116 and the collector of transistor 106 is connected to conductor 88 between voltage regulator 46 and optocoupler 84 by an alarm 118. Alarm 118 emits an audible signal when electrical current flows from conductor 88 through the collector of transistor 106. An LED 120 and resistor 122 are connected between conductor 88 and the collector of transistor 106 parallel to alarm 118. LED 120 produces light having a red color when energized. Thus, device 10 may provide both audible and visual warnings to a user that a load has been disconnected from outlet 64 without deenergizing device 10. Such a condition would exist if the user used a remote control to turn off the television instead of switch 18.

Also connected in parallel with alarm 118 between conductor 88 and the collector of transistor 106 is a relay 124. As shown, relay 124 operates a contact 126 that selectively connects a conductor 128 connector 130 with either the output of voltage regulator 46 or ground at point 116. A diode 132 is connected in parallel with relay 124 to provide a return path for relay discharge currents and to protect transistor 106. Thus, device 10 can control a remote alarm or circuit requiring either a positive DC voltage of common ground activation signal.

Device 10 includes a switch 134 for disconnecting an RF signal provided through a coaxial cable from a television. Switch 134 has a pair of signal transfer relays 136 and 138 connected by conductor 54 to voltage regulator 46 and by conductor 56 to ground so as to be connected in parallel with relay 52. Relays 136 and 138 operate contacts 140 and 142 in conductors 144 and 146 that operate to connect the secondary windings 148 of a step-up impedance transformer 150 with the primary windings 152 of a step-down impedance transformer 154. Alternatively, contacts 140 and 142 can break the connection between windings 148 and 152 and connect the end terminals of each to one another through resistors 156 and 158.

Resistors 156 and 158 are selected to provide a reflected impedance equal to the characteristic impedance of the coaxial cables. This means that all signal power is dissipated in resistors 156 and 158, and no signal power is reflected down this line. This is an essential security feature because conducted emissions are reduced in this matched state. Another essential feature of this design involves stepping up the coaxial cable characteristic impedance, typically by a four-to-one ratio, to the value of the resistors 156 and 158. This reduces the signal current and any conducted emissions by the same ratio.

Switch 134 is provided with an input and an output for an RF signal passing through transformers 150 and 154. The primary windings 160 of transformer 150 are connected by conductors 162 to a jack 164 into which can be plugged a coaxial cable (not shown) carrying an RF signal from a broadcaster. The secondary windings 166 of transformer 154 are connected by conductors 168 to a jack 170 into which can be plugged a coaxial cable for delivering the RF signal to a television. If desired, transformers 150 and 154 may be replaced with bandpass filters.

Coaxial connectors 164 and 170 are specially constructed to isolate the shield connection of the coaxial cables from each other and ground. This construction prevents a fortuitous ground path from the coaxial cables to the ground, isolates both the center and shield of each coaxial cable and greatly reduces potentially compromising conducted emissions.

Figure 2:
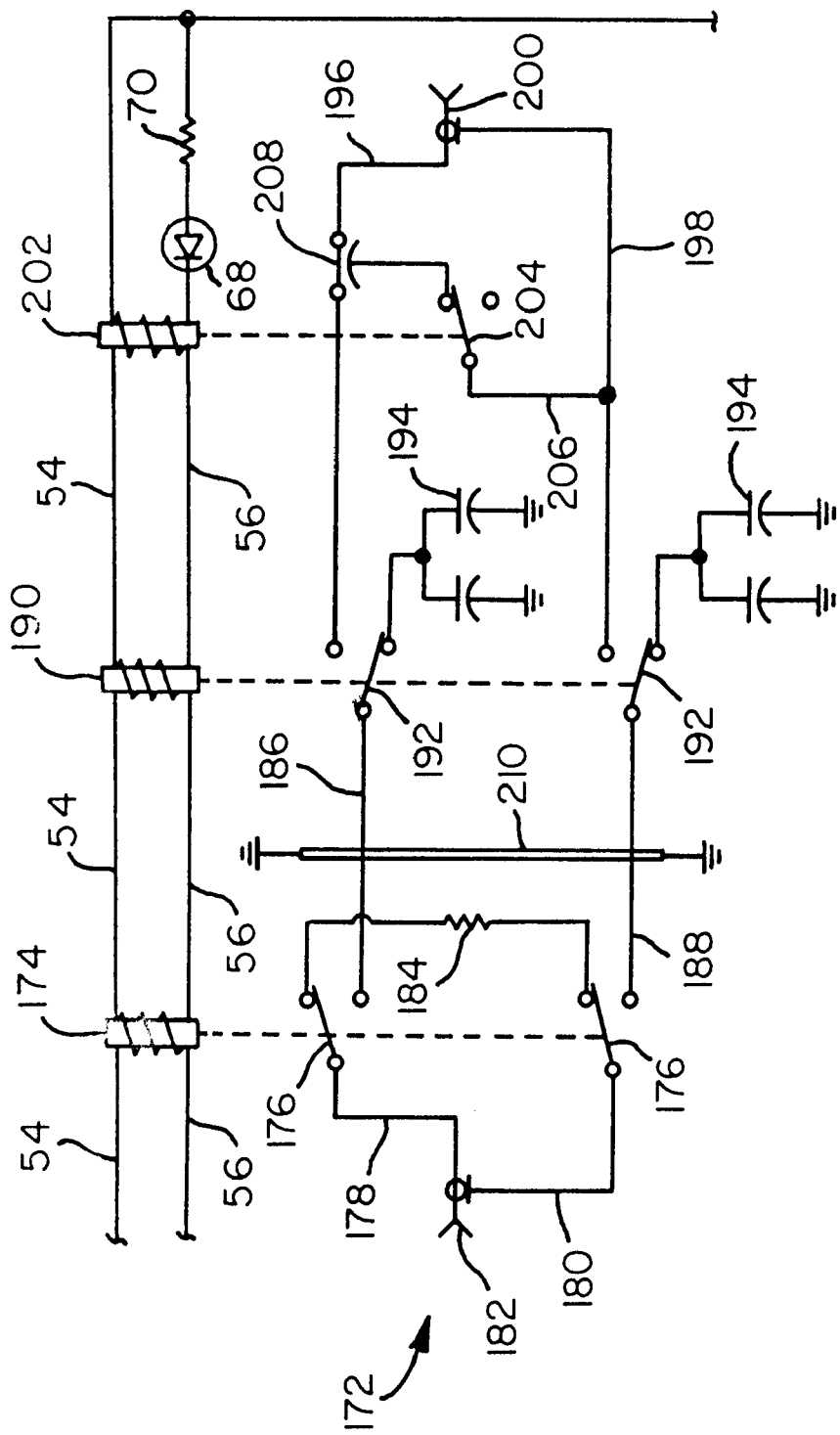
FIG. 2 is a schematic diagram of switch for disconnecting computers from a network that is suitable for use in the security device of FIG. 1 shown in an off or secure condition.

Referring now to FIG. 2, a switch 172 is seen for disconnecting computers from a network that may be substituted for switch 134 in device 10. Switch 172 includes a signal transfer relay 174 connected by conductor 54 to voltage regulator 46 and by conductor 56 to ground so as to be connected in parallel with relay 52. Relay 174 operates a pair of contacts 176 in conductors 178 and 180 extending from a jack 182 into which can be plugged a cable (not shown) transmitting electrical communication signals from a computer network. In one position, contacts 176 place conductors 178 and 180 in electrical communication with one another through a signal terminating resistor 184. Resistor 184 is selected to terminate the signal line in its characteristic impedance for the same reasons described above. In an alternate position, contacts place conductors 178 and 180 in electrical communication with conductors 186 and 188.

A signal transfer relay 190 is connected by conductor 54 to voltage regulator 46 and to ground by conductor 56 so as to be connected in parallel with relay 174. Relay 174 operates a pair of contacts 192 that, in one position, operate to connect conductors 186 and 188 with bypass capacitors 194 and, in another position, operate to connect conductors 186 and 188 with conductors 196 and 198 extending from a jack 200 into which can be plugged a cable (not shown) for transmitting signals to and from a personal computer.

Switch 172 includes a third signal transfer relay 202 that is connected by conductor 54 to voltage regulator and by conductor 56 to ground and is connected in parallel with relay 190. Relay 202 operates a contact 204 in a conductor 206 that connects conductors 196 and 198 together in parallel with jack 200. An RF feed-through capacitor 208 is connected between conductors 196 and 206. The operation of relay 202 provides a near zero impedance signal path to ground for zero voltage or limited current loads.

A shielding partition 210 is fabricated to surround relays 174 and 190. Partition 210 is constructed of metal foil and is connected to ground. It is believed that the provision of shield 210 improves performance and reduces coupling between relay 174 and relays 190 and 202.

Use of device 10 is straightforward. First, conductors 12 and 14 are connected to an AC source and the power cord of a television or VCR is plugged into outlet 64. Next, a coaxial cable carrying an RF signal from a broadcaster like a television station is plugged into jack 164. A similar coaxial cable connected to the television powered through outlet 64 is e plugged into jack 170 for conveying the broadcast RF signal to the television for display.

Device 10 is energized to permit the display of the broadcast signal by closing switch 18 so as to connect conductors 12 and 14 with transformer 30 that, by means of switch 34, has been configured to handle a high or low voltage input. Transformer 30 and rectifying diodes 40 and 42 and capacitors 48 and 50 deliver a steady flow of DC to voltage regulator 46. Electrical current flowing from voltage regulator 46 energizes relay 52 to close contacts 58 thereby permitting AC to reach outlet 64 through conductors 60 and 62. Thus, the television or VCR plugged into outlet 64 may be energized. Illumination of yellow LED 68 indicates that a television connected to device 10 may now be energized but the television is not secure during the period of operation and could possibly be used for eavesdropping.

The flow of electrical current through conductor 60 is sensed by optocoupler 84 that, in turn, controls inverter transistor 96. If a current is found to be flowing through conductor 60, optocoupler 84 delivers a control signal to the base of inverter transistor 96 which brings the collector of transistor 96 to ground at 101. If, however, optocoupler 84 senses no current flowing through conductor 60, as would be the case if the television were unplugged from outlet 64, no control signal is sent to transistor 96 and the collector remains at the DC value set by the voltage divider comprised of resistor 102 and 104. The DC current that would otherwise flow through transistor 96 is, in part, directed to the base of driver transistor 106 that in response energizes alarm 118, illuminates red warning LED 120 and connects conductor 128 to ground to permit a remote alarm to be energized through jack 126.

In another part of device 10, switch 134 operates to connect the television connected to jack 170 with a RF signal source connected to jack 164. Such an event occurs simultaneously with the closing of switch 18 as relays 136 and 138 are energized along with relay 52. Energization of relays 136 and 138 causes contacts 140 and 142 to change from their normal position across terminating resistors 156 and 158 to a position where they connect transformers 150 and 154 together with leads 144 and 146. With transformers 150 and 154 being connected, an RF signal flow from jack 164 to jack 170. Upon opening switch 18 to connect conductor 12 to LED 16, relays 136 and 138 are deenergized to move contacts 140 and 142 to their normal position preventing RF signal carriers to a television from being used for eavesdropping purposes. Illumination of green LED 16 indicates to a user that device 10 has secured his television and making its use for eavesdropping purposes unlikely.

Since all signal power is dissipated by resistors 156 and 158 when device 10 is in the secure mode, radiated emissions characteristic of a wireless eavesdropping device will be greatly attenuated thereby greatly reducing the effective transmission range. Still further reduction of the transmission range may be obtained by constructing device 10 in a fully shielded and grounded aluminum or steel enclosure.

It should be appreciated that device 10 can be used to secure equipment other than televisions and VCRs. For example, device 10 could be used to couple a personal computer to a computer network in a manner that would prevent the computer from being used as for eavesdropping by substituting switch 172 for switch 134. As illustrated in FIG. 2, switch 172 operates to prevent the flow of data from jack 182 to jack 200 when contacts 176, 192 and 204 are in their normal positions. Contacts 176, 192 and 204 are closed to connect jacks 182 and 200 upon the closing of switch 18 that energizes controlling relays 174, 190 and 202. Opening switch 18 deenergizes relays 174, 190 and 202 and returns contacts to their normal positions. Thus, the flip of a switch renders the electrical connectors leading to and from a personal computer or other electronic apparatus useless for eavesdropping.

While the invention has been described with a high degree of particularity, it will be appreciated by those skilled in the art that modifications may be made thereto. For example, a time-delayed deenergization feature like a resettable latching relay could be substituted for manual switch 18 to ensure that AC power and coaxial signal feeds are disconnected after a predetermined time. Therefore, it is to be understood that the present invention is not limited to the two embodiments described above, but encompasses any and all embodiments within the scope of the following claims.

I claim:

1. A security device, comprising:

a power supply;

a pair of first conductors connecting said power supply with a remote source of alternating current;

a first switch associated with said first conductors for selectively breaking the connection between said power supply and said remote source of alternating current upon opening said first switch;

an outlet connected by a pair of second conductors to said pair of first conductors such that said first switch selectively breaks the connection between said outlet and said remote source of current;

a power cutoff relay connected to said power supply so as to be energized by direct current therefrom upon closing said first switch;

a first normally open contact set associated with said second conductors and adapted to be closed by said power cutoff relay when energized to connect said source of alternating current with said outlet;

an alarm connected to said power supply and adapted to emit an audible signal upon being energized by direct current from said power supply;

a current sensor for sensing the flow of alternating current from said outlet;

a second switch operatively coupled to said current sensor for permitting the flow of direct current to said alarm when alternating current flow is sensed by said sensor;

a pair of jacks isolated from common ground and connected together by a pair of third conductors through which a communications signal can be passed;

a pair of signal transfer relays connected to said power supply in series circuit relationship with said power cutoff relay to said power supply; and, a pair of second normally open contact sets associated with said third conductors and each being adapted to be closed by a respective one of said signal transfer relays when energized to connect said jacks together.

2. A security device, comprising:

a power supply for converting alternating electrical current to direct electrical current;

a pair of first electrical conductors connecting said power supply with a remote source of alternating electrical current;

a manually operable switch associated with said first electrical conductors for selectively breaking the connection between said power supply and said remote source of alternating electrical current upon opening said switch;

an electrical outlet connected by a pair of second electrical conductors to said pair of first electrical conductors such that said switch selectively breaks the connection between said electrical outlet and said remote source of electrical current;

a power cutoff relay connected to said power supply so as to be energized by direct electrical current therefrom upon closing said switch;

a first normally open contact set associated with said second electrical conductors and adapted to be closed by said power cutoff relay when energized to connect said source of alternating current with said outlet;

an alarm connected to said power supply and adapted to emit a audible signal upon being energized by direct electrical current from said power supply;

an optocoupler for sensing the flow of alternating electrical current from said outlet;

a pair of transistors coupled to said electrical optocoupler for permitting the flow of direct electrical current to said alarm when alternating electrical current flow is sensed by said optocoupler;

a pair of jacks isolated from common ground and connected together by a pair of third electrical conductors through which an electrical communications signal can be passed;

a step-up impedance transformer and a step-down impedance transformer both terminated in resistive loads and placed in series circuit relationship by said third electrical conductors between said pair of jacks;

a pair of signal transfer relays connected to said power supply in series circuit relationship with said power cutoff relay to said power supply; and, a pair of second normally open contact sets associated with said third electrical conductors between said step-up impedance transformer and said step-down impedance transformer, and each of said second normally open contact sets being adapted to be closed by a respective one of said signal transfer relays when energized to connect said jacks together.

3. A security device, comprising:

a power supply for converting alternating electrical current to direct electrical current;

a pair of first electrical conductors connecting said power supply with a remote source of alternating electrical current;

a manually operable switch associated with said first electrical conductors for selectively breaking the connection between said power supply and said remote source of alternating electrical current upon opening said switch;

an electrical outlet connected by a pair of second electrical conductors to said pair of first electrical conductors such that said switch selectively breaks the connection between said electrical outlet and said remote source of electrical current;

a power cutoff relay connected to said power supply so as to be energized by direct electrical current therefrom upon closing said switch;

a first normally open contact set associated with said second electrical conductors and adapted to be closed by said power cutoff relay when energized to connect said source of alternating current with said outlet;

an alarm connected to said power supply and adapted to emit a signal upon being energized by direct electrical current from said power supply;

an optocoupler for sensing the flow of alternating electrical current from said outlet;

a pair of transistors operatively coupled to said optocoupler for permitting the flow of direct electrical current to said alarm when alternating electrical current flow is sensed by said optocoupler;

a pair of jacks connected to common ground and connected together by a pair of third electrical conductors through which an electrical communications signal can be passed, said third electrical conductors being divided into a pair of end segments each extending from one of said jacks and a middle segment connecting said end segments;

a plurality of signal transfer relays connected to said power supply in series circuit relationship with said power cutoff relay to said power supply; and, a plurality of second normally open contact sets associated with said third electrical conductors and each being adapted to be closed by a respective one of said signal transfer relays when energized to connect said end segments of said third electrical conductors together with said middle segment and opened to respectively to: connect one of said end segments to a resistor, connect said middle segment to a plurality of capacitors and connect the other end segment to ground.

* * * * *